G. E. MAIER.
CHARGING VALVE FOR AIR BRAKE EQUIPMENT.
APPLICATION FILED AUG. 19, 1920.
1,406,466.
Patented Feb. 14, 1922.
3 SHEETS—SHEET 1.
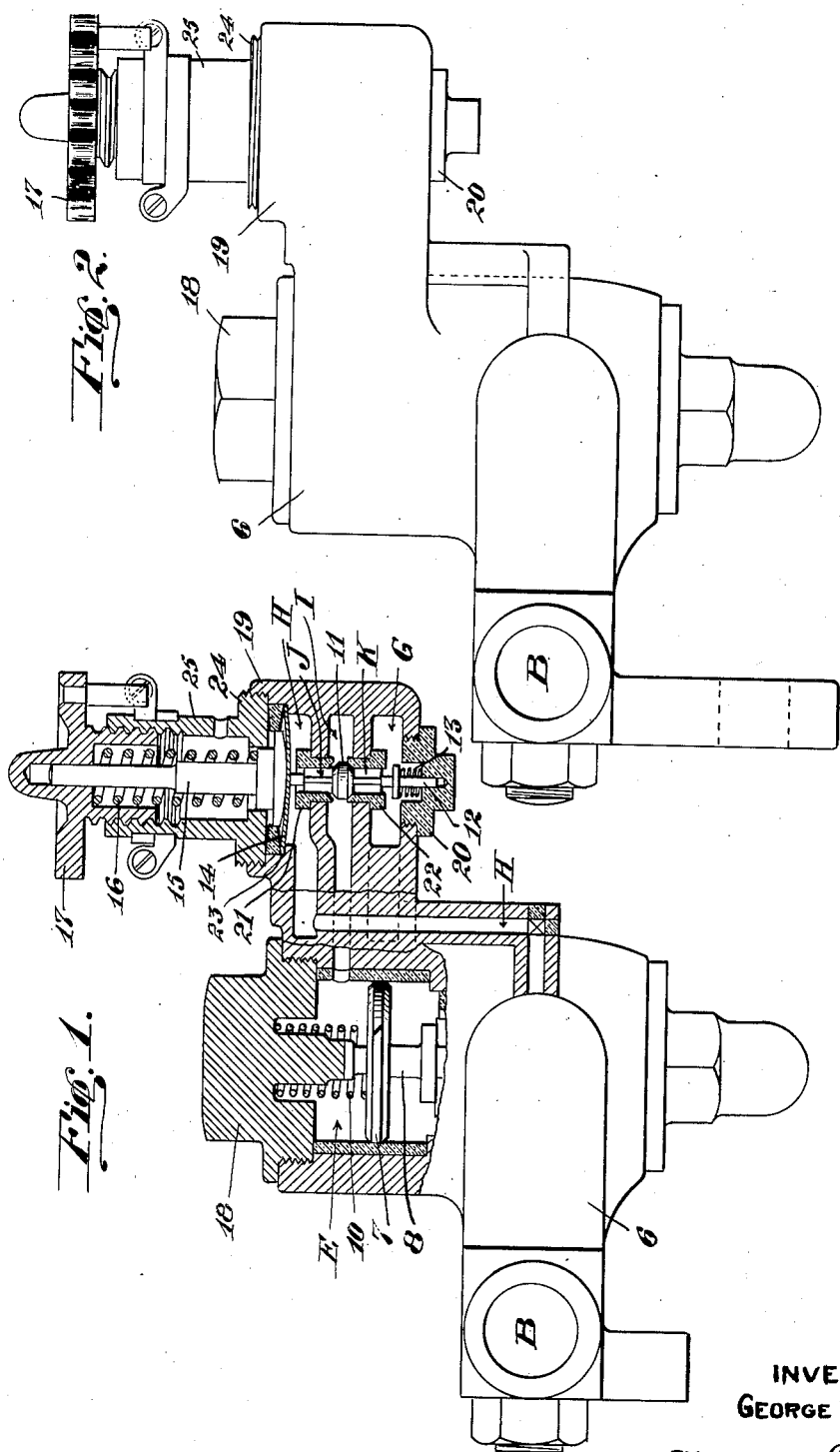
INVENTOR
GEORGE E. MAIER:
BY
ATTORNEY.

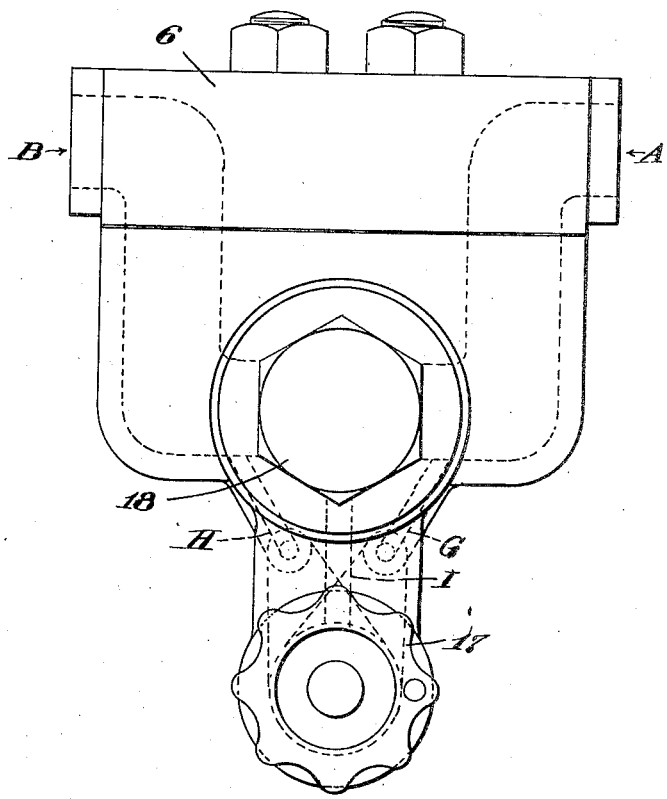

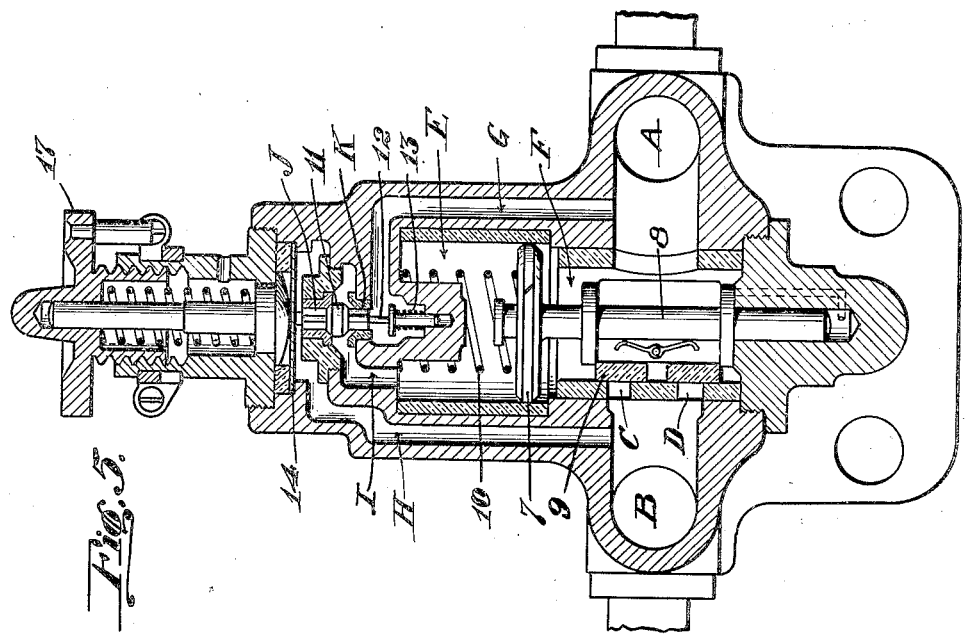
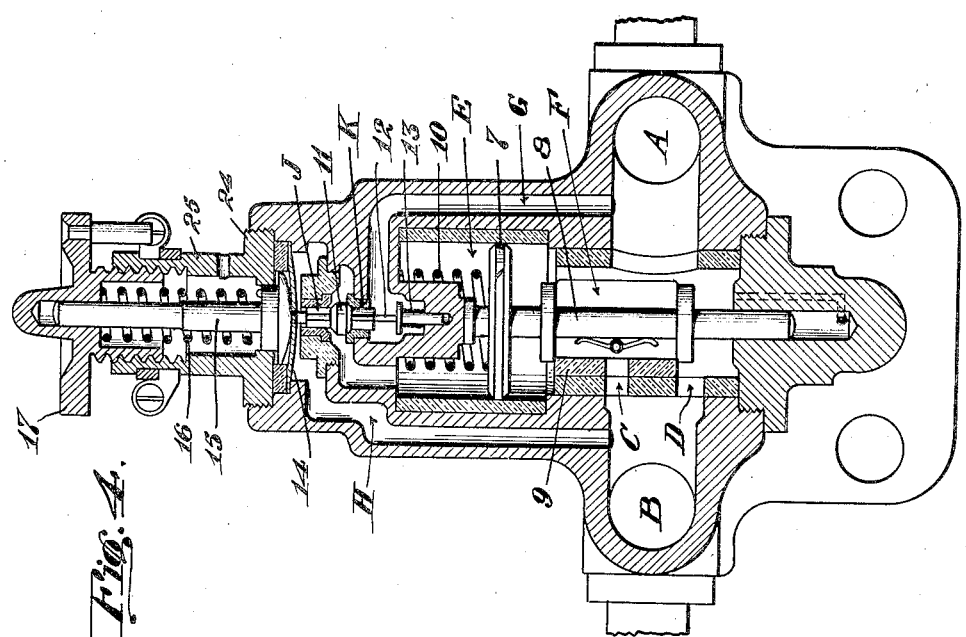

UNITED STATES PATENT OFFICE.

GEORGE E. MAIER, OF LOS ANGELES, CALIFORNIA.

CHARGING VALVE FOR AIR-BRAKE EQUIPMENT.

1,406,466.  Specification of Letters Patent.  Patented Feb. 14, 1922.

Application filed August 19, 1920. Serial No. 404,518.

*To all whom it may concern:*

Be it known that I, GEORGE E. MAIER, a citizen of the United States, residing at Los Angeles, in the county of Los Angeles and State of California, have invented new and useful Improvements in Charging Valves for Air-Brake Equipment, of which the following is a specification.

This invention relates to a charging valve which is especially designed for use in locomotive air brake equipment of the type commonly known as the Westinghouse No. 6 ET equipment and is adapted to be substituted for the ordinary feed valve employed in such equipment and is particularly suitable for use in connection with a charging reservoir as set forth in a copending application.

In the ordinary feed valve commonly employed in locomotive air brake equipment, a control or regulating valve therein frequently becomes clogged by particles of dust, water and oil carried to the regulating valve in the air passing therethrough, thus interfering with proper operation of the regulating valve and preventing accurate functioning of the feed valve; the large volume of air permitted to pass through the regulating valve port direct from the main air reservoir of the locomotive when the regulating valve is opened to main reservoir pressure, carrying with it sufficient foreign matter to eventually cause such accumulation of the foreign matter on the valve and its seat as to inhibit proper operation.

It is the object of this invention to provide a charging or feed valve having a control or regulating valve so constructed and arranged that it may be operated by such a small volume of air as to reduce to a minimum the possibility of foreign matter obstructing the valve and interfering with proper seating thereof.

Another object is to provide a charging valve with a double seating control or regulating valve so located as to minimize the amount of dirt or foreign matter reaching it and so arranged as to have a tendency to keep the valve and its seat clean.

A further object is to provide a charging valve in which the various parts are readily accessible to facilitate cleaning and repairs.

Other objects will appear hereinafter.

The invention is illustrated in the accompanying drawings, in which:

Figure 1 is a view of the charging valve as seen partly in side elevation and partly in vertical section with portions broken away.

Figure 2 is a view in side elevation.

Figure 3 is a plan view.

Figures 4 and 5 are diagrammatic sectional views illustrating the operation of the charging valve.

More specifically, 6 indicates the body of the charging valve which is formed with an inlet chamber A, an outlet chamber B, ports C and D connecting the chambers A and B, a piston chamber E opening at its lower end to a slide valve chamber F communicating with the inlet chamber A, passages G and H leading from the inlet and outlet chambers and terminating in spaced superposed relation above the piston chamber E, a passage I leading from the upper end of the piston chamber and extending intermediate the superposed portion of the chambers G and H and opposed ports J and K connecting the intermediate passage I with the passages G and H.

Mounted in the piston chamber E is a piston 7 fitted with a stem 8 extending downwardly through the chamber F and connecting with a slide valve 9 controlling the ports C and D to open and close communication between the inlet and outlet chambers. A spring 10 acts to normally dispose the piston 7 in a lowermost position, as shown in Figure 5, in which position the slide valve 9 will close the ports C and D; the spring 10 being here shown as located in the piston chamber E and bearing between the upper wall of the latter and the top of the piston. The spring acts to maintain the piston in this lowermost position when the air pressure on opposite sides of the piston is substantially equal.

Mounted in the intermediate passage I between the ports J and K is a double faced valve 11 carried on a stem 12 extending through the ports into the passages G and H. A spring 13 acts on the stem 12 to normally maintain the double faced valve 11 in its uppermost position closing the port J and opening the port K, in which position air under pressure may pass from the inlet chamber to the upper portion of a piston chamber to equalize pressures above and below the piston 7. Arranged in the passage H above the double faced valve 11 is a diaphragm 14 against which the upper ends of the valve stem 12 abuts and bearing against the upper face of the diaphragm 14 is a stem 15 on which a spring 16 bears in oppositition to pressure on the diaphragm, and the tension of which spring is adapted to be adjusted by means of a screw cap 17 between which cap and a stem 15 spring 16 bears.

In the construction of the charging valve, the various parts are preferably arranged as shown in Figures 1 to 3, that is, with the piston chamber E and the piston therein offset in relation to the double faced regulating valve; the upper end of the piston chamber E being formed by a threaded cap 18 which when removed will give access to the chambers E and F and parts mounted therein. The double acting valve 11 is mounted in a horizontally extended portion 19 of the valve casing in which the terminations of the passages G, H and I are formed; a cap 20 being screwed on the underside of the projecting portion opposite the ports J and K in which the lower end of the valve stem 12 seats and which is adapted to be removed to give access to the double acting valve and its mounting. The ports J and K are lined by sleeves 21 and 22 forming seats to the valve 11 and which are adapted to be removed and replaced. The upper portion of the projection 19 of the valve casing is formed with an opening having a marginal flange 23 on which the diaphragm 14 seats and in which opening a cap 24 is screwed and adapted to be removed to give access to the diaphragm and sleeve 21. The cap 24 is formed with a cylindrical extension 25 in which the stem 15 and spring 16 is mounted; the cylinder 25 being threaded to receive the screw cap 17.

In the application and operation of the invention, the inlet chamber A of the valve casing is connected to a source of air under pressure such as the main reservoir of the air brake equipment of a locomotive and the outlet chamber B is connected to a pipe line leading to any suitable point of discharge to which air is to be automatically delivered to the charging valve from the main supply at a reduced pressure, which reduced pressure is predetermined and governed by the spring 16 acting on the diaphragm 14. When the pressure on the outlet side of the valve is normal the parts of the valve will be positioned as illustrated in Figure 5, that is, with the diaphragm 14 retracted under pressure in the chamber B and passage H in which position valve 11 will close port J and open port K so that main reservoir pressure in the chamber A will enter the piston chamber E at its upper end through the port K and its lower end through the chamber F, thus equalizing pressure on opposite sides of the piston 7 so that the latter will be acted on by the spring 10 and moved to its lowermost position to close ports C and D by the slide valve 9. On reduction of pressure in the outlet chamber B and passage H the diaphragm 14 will be pressed downwardly under action of spring 16 so as to shift valve 11 to open ports J and close port K, thus cutting off communication between the upper portions of the piston chamber and the main reservoir and opening communication between the upper portion of the piston chamber to the passage H and outlet chamber so as to vent excess pressure from above the piston and equalize pressure in the upper portion of the piston chamber with that of the outlet chamber. The pressure from beneath the piston 7 will then be in excess of that above the piston and operated in opposition to spring 10 to raise the piston and thereby move the slide valve 9 to open the ports C and D. Main reservoir pressure will then pass into the chamber A through the chamber B until such time as the pressure in the chamber B will be raised sufficiently to restore the diaphragm 14 to normal whereupon the spring 13 will act to close the valve 11 against port J and open valve K so that main reservoir pressure will then pass through the chamber above the piston 7 and permit the spring 10 to restore the piston to normal.

In the foregoing it will be seen, that in operation of the double acting regulating valve 11 in exhausting pressure from above the piston 7 only such air will pass through the valve port J as to equalize pressure in the upper portion of the piston chamber and the passage H which under ordinary working condition will be extremely small and that in recharging the upper portion of the piston chamber only a very small volume of air will be admitted to the piston chamber from the main reservoir, thus reducing the possibility of the valve being clogged to a minimum. Furthermore, the regulating valve being located out of the path of flow of the air from the inlet and outlet chambers, the possibility of foreign matter being carried to the regulating valve is very remote.

While I have specified my invention as applicable to air brake equipment of locomotives it may obviously be employed wherever devices of this character are serviceable, and while I have shown and described the specific embodiment of my invention I do not limit myself to the exact details of construction and the arrangement shown, but may resort to such modifications and changes as occasion may require coming within the spirit and scope of the appended claims.

I claim:

1. In a charging valve for air brake equipment, a valve casing having an inlet chamber, an outlet chamber and ports forming communication between said chambers; a slide valve for opening and closing said ports, a piston chamber in said casing in open communication at one end with the inlet chamber, a piston in said chamber connected to said slide valve, a valve normally opening communication between the other end of said piston chamber and the intake chamber and closing communication between the piston chamber and the outlet chamber, and means operable by reduction of pressure in the outlet chamber for operating said valve to open communication between the piston chamber and outlet chamber and to close communication between the piston chamber and the inlet chamber whereby pressure above the piston will be reduced relative to pressure beneath the piston to effect movement of the latter to open the slide valve.

2. In a charging valve for air brake equipment, a valve casing having an inlet chamber and an outlet chamber and provided with ports forming communication between said chambers, a slide valve normally closing said ports, a passage leading from each of said chambers having portions extending parallel with each other, an intermediate passage extending between said pair of passages, opposed ports leading from said intermediate passage to each of the pair of passages, a valve arranged between said ports, a spring acting on said valve to close the port leading to the outlet chamber, means operable by reduction in pressure in the outlet chamber for moving the valve in opposition to the spring to open said last named port and to close the other port, and means whereby operation of the valve by reduction of pressure in the outlet chamber will operate the slide valve to open communication between the inlet and outlet chambers.

3. In a charging valve for air brake equipment, a valve casing having a piston chamber therein, a pair of passages having opposed ports communicating with said piston chamber, a valve mounted between said ports to open either of the ports and close the other, a spring for holding the valve to close one of the ports and to open communication between one of the passages and the piston chamber, and a spring pressed diaphragm operable by reduction of pressure in the other passage for moving the valve in opposition to said spring to open communication between said last named passage and the piston chamber and to close communication between the other passage and the piston chamber.

4. In a charging valve, a valve casing having an inlet chamber and an outlet chamber with ports connecting said chambers, a piston chamber in open communication at one end with the intake chamber, a pair of passages leading from the inlet and outlet chambers extending to overlap each other, a passage leading from the upper end of the piston chamber and opening through opposed ports to the pair of passages to afford communication between the upper end of the piston chamber and the inlet and outlet chambers, a double faced valve arranged between the ports for closing either port and opening the other and normally closing the port leading to the outlet chamber and opening the port leading to the inlet chamber, a piston in the piston chamber, a slide valve connected to said piston for opening or closing the ports connecting the inlet and outlet chambers, a spring acting on said piston when air pressure is substantially equal on opposite sides of the piston to dispose the piston in a position to close the slide valve, and means operable by reduction of pressure in the outlet chamber for operating the double faced valve to close the port leading to the inlet chamber and open the port leading to the outlet chamber to vent the piston chamber above the piston whereby pressure below the piston will act to move it in opposition to its spring and thereby open the slide valve to effect communication between the inlet and outlet chambers.

5. In a charging valve, a valve casing having an inlet chamber and an outlet chamber with ports connecting said chambers, a piston chamber in open communication at one end with the intake chamber, a pair of passages leading from the inlet and outlet chambers extending to overlap each other, a passage leading from the upper end of the piston chamber and opening through opposed ports to the pair of passages to afford communication between the upper end of the piston chamber and the inlet and outlet chambers, a double faced valve arranged between the ports for closing either port and opening the other and normally closing the port leading to the outlet chamber and opening the port leading to the inlet chamber, a piston in the piston chamber, a slide valve connected to said piston for opening or closing the ports connecting the inlet and outlet chambers, a spring acting on said piston when air pressure is substantially equal on opposite sides of the piston to dispose the piston in a position to close the slide valve, a diaphragm arranged in the passage communicating with the outlet chamber, a spring bearing on said diaphragm in opposition to pressure in the outlet chamber adapted to move the diaphragm on reduction of such pressure, and means whereby operation of the diaphragm by the spring will operate the double faced valve to close the port leading to the inlet chamber and open the port leading to the outlet chamber to vent the piston chamber above the piston whereby pressure below the piston will act to move it in opposition to its spring and thereby open a slide valve to effect communication between the inlet and outlet chambers.

6. In a charging valve, a valve casing having an inlet chamber, an outlet chamber, ports connecting said chambers, a piston chamber communicating at its lower end with the inlet chamber, a series of three superposed passages, the lowermost passage communicating with the inlet chamber, the uppermost passage communicating with the outlet chamber and the intermediate passage communicating with the upper portion of the piston chamber, and opposed ports connecting the intermediate passage with the upper and lower passages; a spring pressed piston in the piston chamber, a slide valve connected to said piston normally closing the ports connecting the inlet and outlet chambers, a vertically movable double faced valve interposed between the ports connecting the superposed passages, a vertical stem upon which said valve is mounted, a spring acting on said stem bearing upwardly thereon normally positioning the valve on the stem to close the port between the intermediate and uppermost passages, a diaphragm arranged in the uppermost passage bearing on said stem, a spring arranged to bear upon said diaphragm to move the latter downwardly on reduction of air pressure in the uppermost passage to move the double faced valve downwardly in opposition to its spring thereby closing the port between the intermediate and lowermost passages and opening the port between the intermediate and uppermost passages to vent the upper portion of the piston chamber and to cause the piston to move upwardly in opposition to its spring under action of the pressure from the inlet chamber to open the slide valve and thereby deliver increased pressure to the outlet chamber and the uppermost passage, and means for adjusting the tension of the spring acting on the diaphragm.

GEORGE E. MAIER.